US009389089B2

(12) United States Patent
Wingrove et al.

(10) Patent No.: US 9,389,089 B2
(45) Date of Patent: Jul. 12, 2016

(54) DETERMINING A ROUTE BASED ON A PREFERENCE

(71) Applicants: Theodore Charles Wingrove, Plymouth, MI (US); Anthony Joseph Ciatti, Ann Arbor, MI (US); Bryan Glenn DeGrendel, Ann Arbor, MI (US)

(72) Inventors: Theodore Charles Wingrove, Plymouth, MI (US); Anthony Joseph Ciatti, Ann Arbor, MI (US); Bryan Glenn DeGrendel, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/477,292

(22) Filed: Sep. 4, 2014

(65) Prior Publication Data

US 2016/0069693 A1 Mar. 10, 2016

(51) Int. Cl.
*G01C 21/00* (2006.01)
*G01C 21/34* (2006.01)
*G01C 21/36* (2006.01)

(52) U.S. Cl.
CPC ............ *G01C 21/34* (2013.01); *G01C 21/3415* (2013.01); *G01C 21/00* (2013.01); *G01C 21/3605* (2013.01)

(58) Field of Classification Search
CPC ............... G01C 21/00; G01C 21/3415; G01C 21/3605; G01C 21/3664; G01C 21/3461; G01C 21/3469
USPC ......... 701/400, 410, 468, 411, 414, 418, 420, 701/532; 705/14.58
See application file for complete search history.

(56) References Cited

U.S. PATENT DOCUMENTS

| 6,615,133 | B2 | 9/2003 | Boies et al. |
| 7,660,651 | B2 | 2/2010 | Zhong |
| 7,912,637 | B2 | 3/2011 | Horvitz et al. |
| 8,825,374 | B2* | 9/2014 | Dimitriadis ........ G01C 21/3415 701/411 |
| 8,892,674 | B2* | 11/2014 | Horvitz ................ G06Q 10/107 709/206 |
| 8,971,519 | B1* | 3/2015 | Hoffberg ............ H04M 3/5232 379/265.01 |
| 2008/0081641 | A1 | 4/2008 | Smith et al. |
| 2012/0271541 | A1* | 10/2012 | Hjelm ................ G01C 21/3484 701/410 |

FOREIGN PATENT DOCUMENTS

| EP | 1909231 A1 | 4/2008 |
| EP | 1993075 A1 | 11/2008 |
| EP | 1993076 A1 | 11/2008 |
| WO | 2004/010401 A2 | 1/2004 |
| WO | 2005/100918 A2 | 10/2005 |
| WO | 2007/120833 A2 | 10/2007 |

* cited by examiner

*Primary Examiner* — Gertrude Arthur Jeanglaud
(74) *Attorney, Agent, or Firm* — Dickinson Wright PLLC

(57) ABSTRACT

A system and method for determining a route based on a preference are provided. The system includes a destination receiver to receive a destination from a GPS receiver in communication with a GPS system; a preference retriever to retrieve the preference based on a parameter, the preference being based on a recorded decision made by an operator associated with the GPS receiver or the GPS system in traversing a path to the destination; and a route analyzer to determine the route based on at least one of the preference or an optimal route calculated by a GPS system in communication with the GPS retriever. Also provided is a method for monitoring a preference associated with a route.

15 Claims, 5 Drawing Sheets

DETERMINING A ROUTE BASED ON A PREFERENCE

BACKGROUND

Guidance systems, for example, while travelling via a vehicle has allowed people to travel in a more unencumbered state. Instead of pre-mapping a route, information and instructions on how to proceed may be dynamically provided to a traveler.

Guidance systems may be implemented or installed in a vehicle. Thus, a driver while driving may consult the guidance system and be given instructions as to whether to proceed, turn right/left, enter on an on-ramp, for example.

In a common implementation of guidance, a global positioning satellite (GPS) communicates with an end-point, often in the vehicle. The GPS ascertains where the driver is, interfaces the coordinates or information of the driver with a centralized database, and is capable of triangulating the driver's present location with a pre-existing map of the area.

In turn, the driver may enter a destination. The destination may be an address, a general area, or a specific destination, for example. Modern GPS systems determine a route based on known information about available roadways and maps. The known information may be augmented with other known parameters, for example, the estimated time to complete the route based on speed restrictions, known or measured traffic, or the like. The information is stored at a database associated with or in communication with the GPS system. Thus, the GPS system may deliver a route based on knowing the GPS operator's current location and destination.

In calculating the route, as stated above, various known quantities and factors may be employed. In this way, the driver may ensure that the route being provided is optimized. For example, the GPS system may interface with a local traffic system, and be made aware of various conditions, like construction, accidents, congestion, or road closures that may affect the overall traffic associated with a specific route or portion of the route. In these cases, the route may be recalculated, and provided based on being provided information associated with these various conditions.

Thus, the technologies associated with conventional GPS systems employ a route calculation at the location providing the route. The route calculation may employ information provided by third-parties (traffic servers, weather servers, and the like).

SUMMARY

A system and method for determining a route based on a preference are provided. The system includes a destination receiver to receive a destination from a GPS receiver in communication with a GPS system; a preference retriever to retrieve the preference based on a parameter, the preference being based on a recorded decision made by an operator associated with the GPS receiver or the GPS system in traversing a path to the destination; and a route analyzer to determine the route based on at least one of the preference or an optimal route calculated by a GPS system in communication with the GPS retriever. Also provided is a method for monitoring a preference associated with a route.

DESCRIPTION OF THE DRAWINGS

The detailed description refers to the following drawings, in which like numerals refer to like items, and in which.

DETAILED DESCRIPTION

Figure 1:
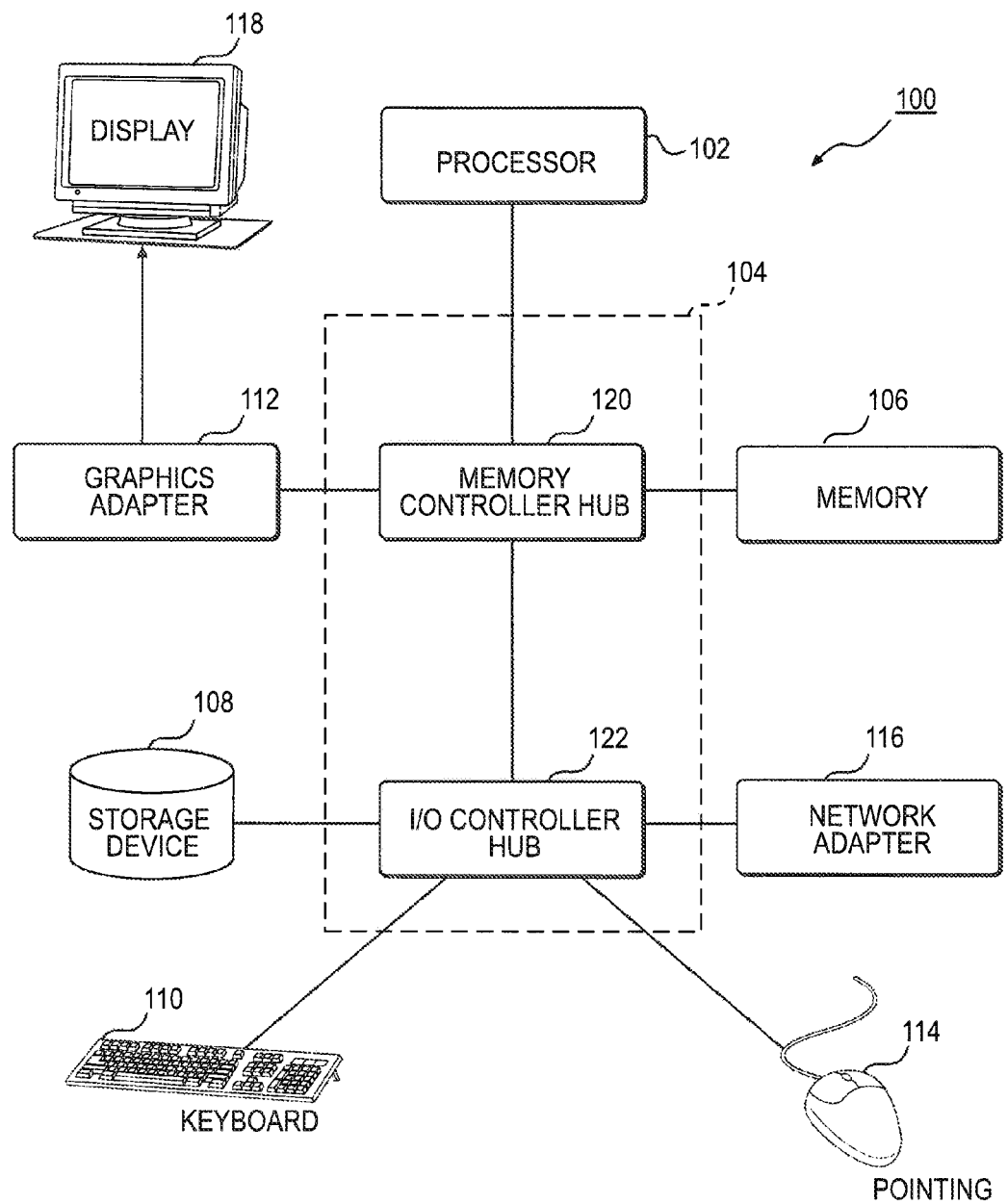
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

GPS systems and other network providers deliver route information based on information about the route and a variety of other known factors. The route information may be based on a current location, a destination, and other parameters known about the roads and conditions being traversed on.

As explained in the Background section, the parameters may pertain to a variety of knowable conditions, such as road status, speed restrictions, accidents, constructions, weather, and the like. These known conditions can be analyzed, and an optimal route may be calculated.

However, in calculating or determining a route by the conventional techniques known above, one important factor is ignored. For example, in numerous situations and contexts, a driver or actual traveler may determine an optimal route for traversing a path from point A to point B. The driver may have a priori information, or real time information about a route or a decision associated with the route that may be more suitable for the driver.

The conventional techniques for route determination employ known information sourced from either the GPS system or a third-party service. However, none of these techniques employ actual driver or operator knowledge.

In numerous situations, a driver or a possessor of a GPS receiver may employ personal modifications to a route. For example, a driver may notice that a tree has fallen at a specific point on a road, and thus, take a path that deviates from the suggested route. The road may have excessive potholes, and thus, the driver may decide to avoid the route in question. Numerous additions and modifications to a specific route may be made based on data and points not known by the GPS system or even a third-party information provider (such as a traffic or weather server).

In other cases, a driver may be fairly cognizant of a specific route, and know that a specific traffic signal takes a significant amount of time to change status. In this case, the driver may choose to take a longer route to avoid the traffic signal, and thus, save time in the process.

Thus, because a driver actions and preferences are not known in calculating a GPS system's recommendations, the route chosen is not always ideal (either in efficiency or driver preference). An optimized route may not encompass information known about the driver's actions (or conversely, another driver's actions). In this way, the cognitive thought process employed by a driver to make decisions is wholly removed in a route calculation.

Disclosed herein are methods and systems for determining a route based on a preference. Thus, employing the aspects disclosed herein a GPS system, in communication with a GPS receiver, may calculate a route not only based on information known by the GPS system, but also based on behavioral actions and other factors associated with a single driver (or collection of drivers). By employing behavioral or actual driving patterns, the route analysis disclosed herein may be able to dynamically alter or provide a route in a robust and advantageous way. Thus, conventional routes, provided and optimized in conventional manners discussed above may be improved to encompass driver preferences, empirical choices associated with the driver or other drivers, and other factors not readily known by a GPS system or an affiliated third-party services.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
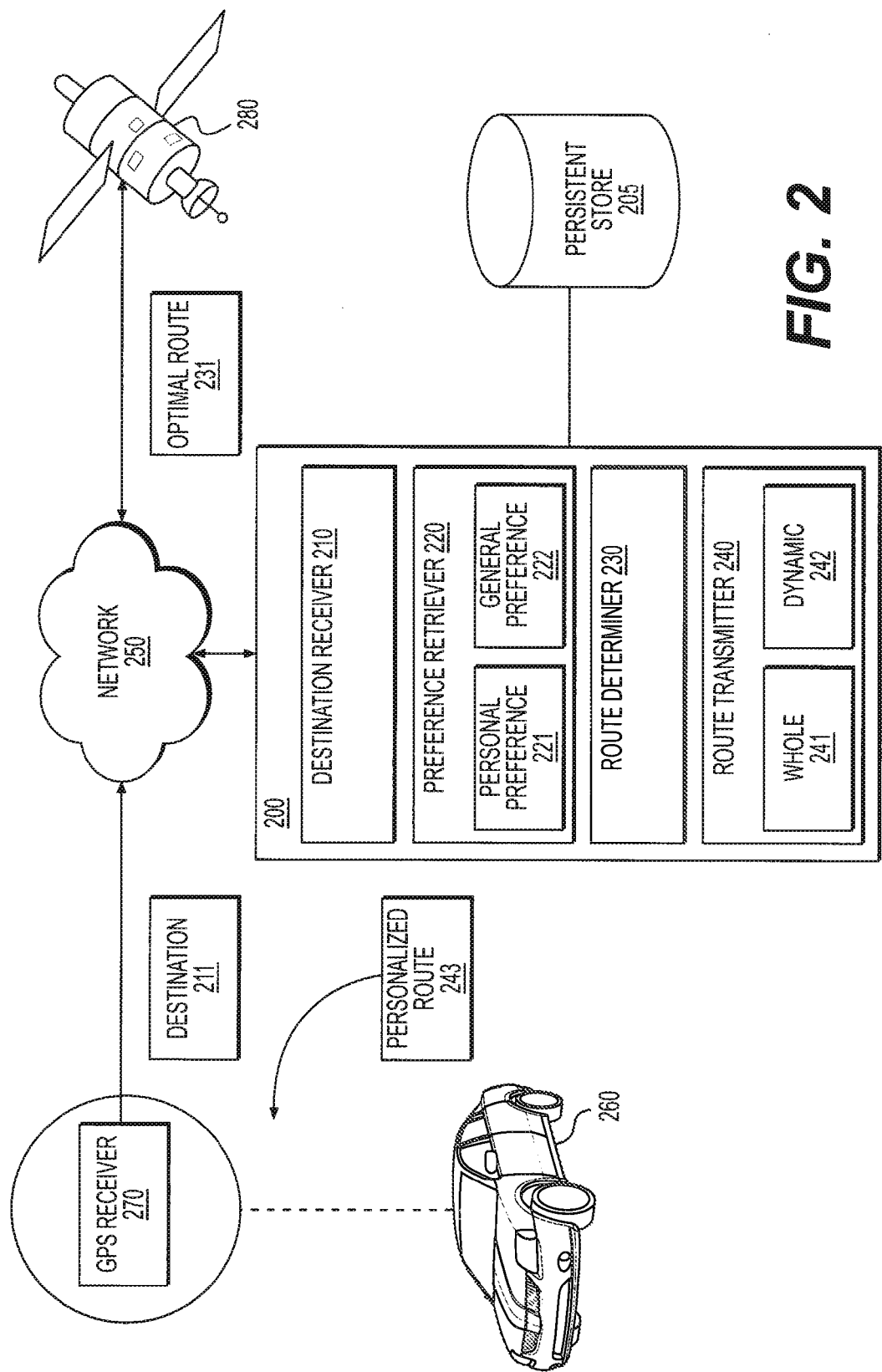
FIG. 2 is an example of a system for determining a route based on a preference.

FIG. 2 is an example of a system 200 for determining a route based on a preference. The system 200 includes a destination receiver 210, a preference retriever 220, a route determiner 230, and a route transmitter 240. The system 200 may be implemented on a device or hardware, such as those enumerated above with regards to computer 100.

The system 200 may be implemented with an existing GPS system 280, or be integrated with a new system (not shown). In either case the GPS system 280 may communicate to a GPS receiver 270 over satellite communication, information delivered over the Internet, or the like. The GPS system 280, the GPS receiver 270, and system 200 may also communicate with each other over network 250.

The GPS receiver 270 may be implemented in various contexts and location. One such popular location is a vehicle 260. The vehicle 260 may be equipped with the GPS receiver 270 so that the GPS receiver 270 is capable of delivering information to an operator of the vehicle (or passenger).

The GPS receiver 270 may provide information to the vehicle 260's operator or a passenger in various techniques known to one of ordinary skill in the field of human machine interfaces. For example, the GPS receiver 270 may audibly present the information, textually present the information, or provide the information via a map or some other sort of graphical presentation.

The operator of the GPS receiver 270 may register with the GPS system 280, or system 200. Thus, the operator's preferred routes or preferences may be stored, such as in persistent store 205. Persistent store 205 may be any sort of data storage known to one of ordinary skill in the art, such as those enumerated above with regards to data store 108.

For example, if the operator chooses to opt-out of all, some, or none of the features of system 200, the decision to opt-out is stored in a persistent store 205.

The destination receiver 210 receives a destination 211 via the GPS system 280 or the GPS receiver 270. The destination 211 received may be a coordinate, a place, an address, a general area, or any sort of information pertaining to a specific area or location. The GPS system 280 is in communication with a GPS receiver 270, and in turn, when the operator of a vehicle 260 enters a destination 211 via an interface provided with the GPS receiver 270, the GPS receiver 270 may transmit the destination 211 via network 250 to GPS system 280.

The preference retriever 220 interfaces with the persistent store 205 to retrieve information about the operator of the vehicle 260's preferences. In certain cases, the operator of the vehicle 260 may be anonymous or not known. However, preferences of other drivers who have traversed the same route, or portions of the route, may still be retrieved.

The preference retriever 220 may retrieve personalized preferences 221 associated with the specific operator of the vehicle 260. In this situation, the personalized preferences 221 may maintain a log of certain decisions made by the operator in prior traversals of the route. For example, if the optimized route from point A to point B is a specific route, and the personalized preference 221 information indicates that an operator makes a different decision on all or some (for example, over a specific count or percentage threshold) prior instances of traversing the route from point A to point B, the personalized preference 221 information may indicate this information.

The preference retriever 220 may also retrieve general preferences 222. The general preference 222 is an indication of information associated with all operators (i.e. not just the operator associated with the vehicle 260 that requested a route or guidance for destination 211). The general preference 222 information may include various information about decisions made by other operators of GPS receiver 270, or other GPS receivers that interface with GPS system 280. The general preference 222 may include decisions for the destination 211 in question, or alternatively, for portions of the destination 211 from other routes that may overlap with some or all of destination 211.

In some embodiments, the personalized preference 221 information and the general preference 222 information may be weighted based on the time and recentness of the decision, so that decisions made more recently are given a greater weight.

The route determiner 230 determines a route to transmit to a GPS receiver 270. The route determiner 230 may employ either the optimal route 231 (calculated and determined in the conventional ways described above), or may employ a route calculated by either the personalized preference 221 information retrieved or a general preference 222 information retrieved, or a combination of both.

In generating a route for either the personalized preference 221 information and the general preference 222 information, various time and other information may be recorded along with the data points. For example, the information may indicate various completion times recorded for each route or decision made by the operator. Thus, in determining which route to choose, the route determiner 230 may take into account that a certain route has an average completion time that is less than other available routes.

In certain cases, the information and decision may be combined with other details. For example, the route determiner 230 may determine that one of the above-enumerated options for a route has an average completion time shorter during certain portions of the day, or on specific days. For example, during a week day, and specifically during rush hour, a specific optimal route may not be effective relative to a route retrieved with information 221 or 222, due to the amount of cars and other vehicles associated with that route. However, during the weekend, the optimal route 231 may be the most effective route. Thus, the route determiner 230 may be configured to determine the delivered route based on the time of day, the specific day, or the like.

The route determiner 230 may determine the start position via numerous techniques known to one of ordinary skill in the art. For example, the GPS receiver 270 may transmit its current location to the GPS system 280. In another example, the operator of the GPS receiver 270 may transmit a location manually through an interface.

The route determiner 230 may determine either the whole route, or employ the aspects disclosed herein for a partial segment of the route.

The route transmitter 240 may either transmit a personalized route 243 as a whole route 241, or a dynamic route update 242 to the GPS receiver 270 via a network 250. For example, a whole route 241 may be transmitted to the GPS receiver 270, and the operator may either choose to employ the route, or follow the optimal route 231, or a combination of each.

In another situation, the operator may be provided a dynamic route update 242 periodically or at each point of a traversal to a destination in which a decision is made. Thus, the personalized route 243 may be continuously communicated to the GPS receiver 270. For example, if the operator of a vehicle 260 is at a specific location, and the personalized preference 221 indicates that the operator of the vehicle 260 makes a certain decision at or over a predetermined threshold of times, the route transmitter 240 may transmit a personalized route 243 based on the personalized preference 221.

In another example, the route 243 (i.e. not the optimal route 231, but one based on either the personalized preference 221 information or the general preference 222 information) may be transmitted via the dynamic route update 242 if the empirical data of times associated with the user chosen routes is faster than empirical or calculated data associated with the optimal route 231.

In another example, the route transmitter 240 may transmit all three (or two) of the routes, i.e. a route based on the optimal route 231, a route based on the personalize preference 221 information, or a route based on general preference 222 information. The GPS receiver 270 may be configured to allow the operator of vehicle 260 to view all three routes on a map, textual, or audio based information conveying interface. Thus, the various routes may be shown on the GPS receiver 270 via an overlaid fashion or simultaneously presented.

Figure 3:
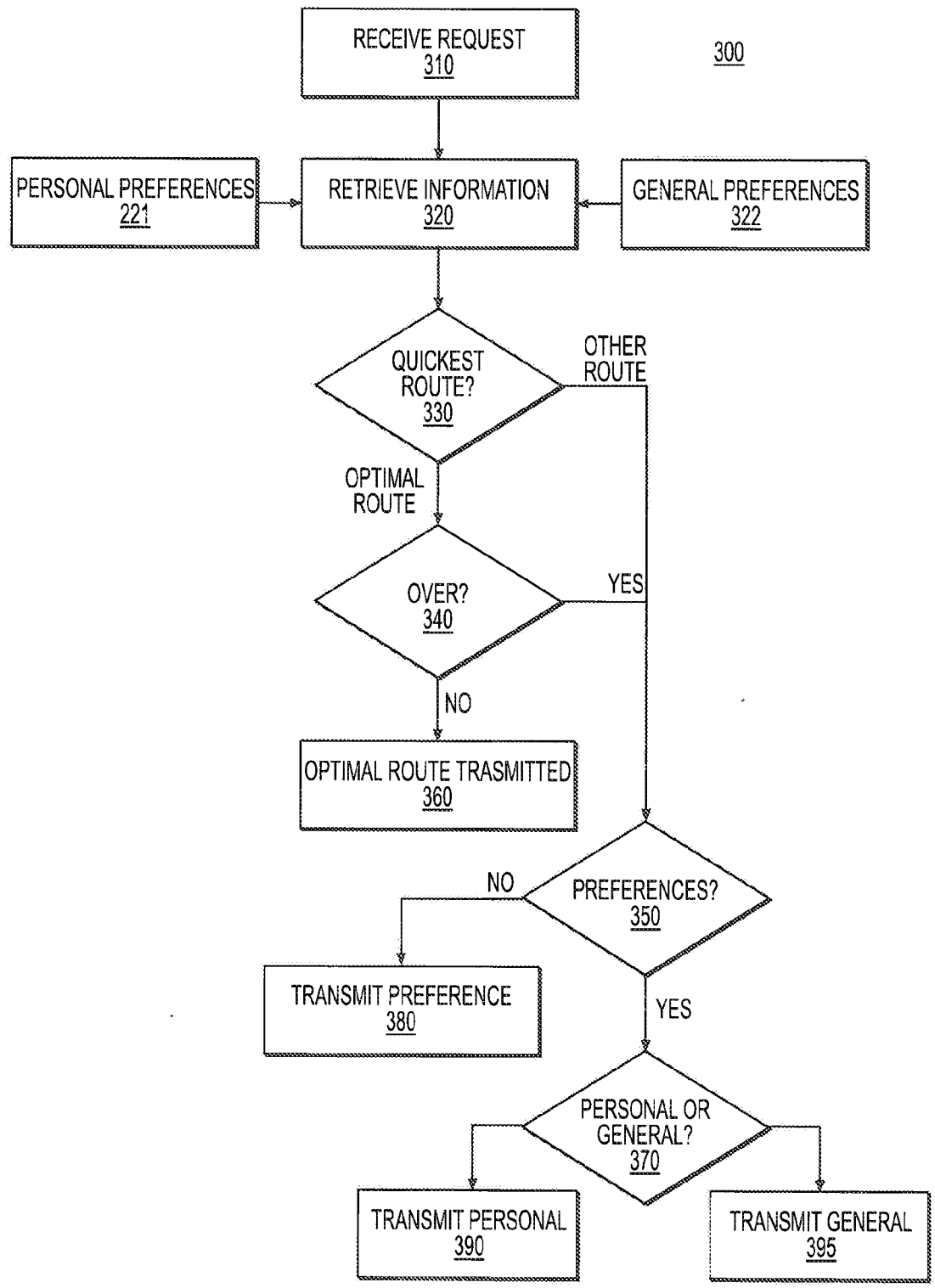
FIG. 3 is an example of a method for determining a route based on a preference.

FIG. 3 illustrates a method 300 for determining a route based on a preference. The method 300 may be implemented on a device, such as system 200.

In operation 310, a request is received for a destination. In an alternate implementation, a destination may be predicted based on operator of the GPS receiver's previous routes taken. For example, if the operator is traversing a route the operator has previously taken on numerous occasions (for example a commute from a work place to one's home), in operation 310, the destination may be determined even if no destination is positively submitted or indicated.

In operation 320, information associated with the operator of the GPS receiver is retrieved. In certain cases, if the operator is identifiable, and has opted-in to method 300, personal preferences 321 may be retrieved. In other cases, general preferences 322 may be retrieved. The personal preference 321 information and the general preference 322 information is similar to the preferences 221 and 222 discussed above.

In operation 330, a determination is made as to which route is the quickest, the optimal route (see Background section), a route based on the personalized preference 321 (if available), or a route based on the generalized preference 322 (also, if available). In one example, the optimal route may be compared against empirical data for the times based on routes associated with the personal preference and the general preferences retrieved in operation 320. The implementer of method 300 (or a device receiving the route) may restrict the times and information chosen based on proximity to the current time of day, specific day, or some other demarcated time segment.

If the optimal route is determined (method 300 proceeds to operation 340), a determination may be made as to whether an override is set for either the personalized preference 321 route, or the generalized preference 322 route. If an override is set and a route exists based on either the personalized preference 321 route and/or the generalized preference 322 route, the method proceeds to operation 350.

If the determination in operation 340 is that no override exists, the method proceeds to operation 360, where the route selected is based on an optimal route calculated by a GPS system.

If the determination is that the personalized preference 321 route and/or the generalized preference 322 route is the fastest route (for example, employing empirical data over a predetermined time period), the method 300 in operation 330 proceeds to operation 350.

In operation 350, a determination is made as to whether both a personalized preference 321 route exists, and a general preference 322 route exists, and if so, the method 350 proceeds to operation 370. If not, in operation 380 the route transmitted to a GPS receiver is the route that exists (i.e. either the personalized preference 321 route or the general preference 322 route). If only one of the personal preference 321 or the general preference 322 exists, the method 300 proceeds to operation 380. In operation 380, the route based on the existing preference is transmitted.

In operation 370, a determination is made as to whether the personalized preference 321 route or the general preference 322 route is faster. As explained above, the determination may employ various techniques, for example, reviewing empirical data associated with the available routes. Thus, when the operator (or multiple operators) has travelled a specific route, or makes a decision associated with a specific route, the time associated with traversing from point A to point B may be recorded based on this decision. If the personal preference 321 route is determined to be faster, in operation 390, this route is transferred to a GPS receiver. If the general preference 322 route is determined to be faster, in operation 395, this route is transferred to a GPS receiver.

Figure 4:
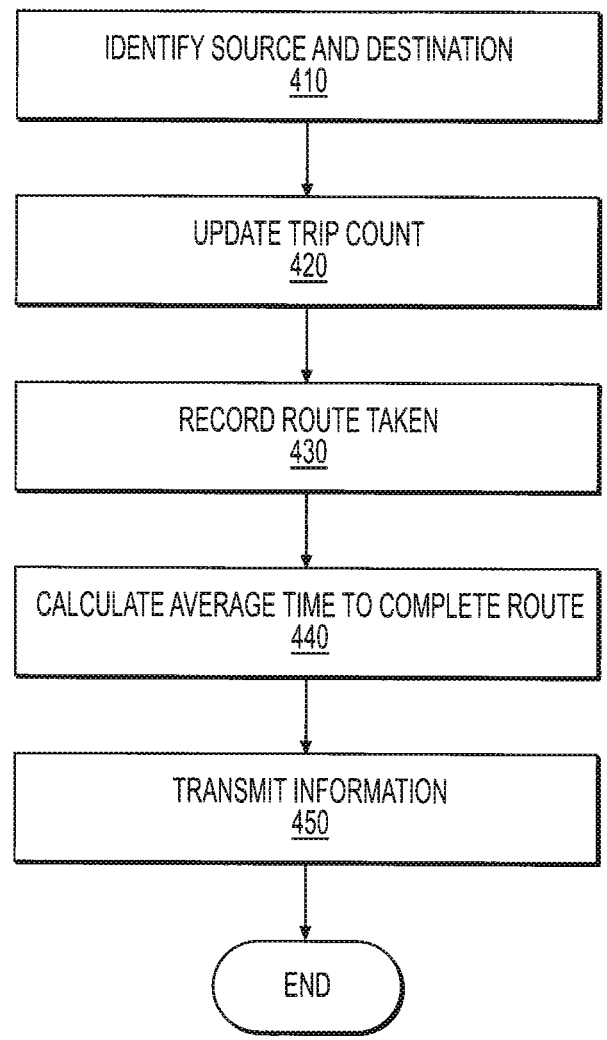
FIG. 4 is an example method for monitoring a preference associated with a route.

FIG. 4 illustrates an example method 400 for monitoring a preference associated with a route. The aspects disclosed in reference to method 400 may be stored, and delivered to system 200 or an implementer of method 300.

In operation 410, a source location and a destination location are identified. For example, the source location and the destination location may be a commonly taken route, such as one's daily commute, or a trip from a home to a grocery store. In another example, the source location and destination location may correspond to a manually entered destination via a GPS receiver.

In operation 420, a count is updated associated with the source location and the destination location. Accordingly, if the operator of a vehicle makes the trip a 15 times, this information is recorded.

In operation 430, the various decisions made to take the route are recorded. Thus, specific decisions to turn left, turn right, or take a specific exit may be recorded.

In operation 440, the average time to complete each route is recorded. In another implementation of method 400, the specific time and day may be recorded as well.

In operation 450, the information ascertained and recorded in method 400 is transmitted along with an identity of the operator. If the operator is not known, or has not given permission to transmit his or her identity, the information may be transmitted anonymously and stored in a database with an aggregated total of all or some users associated with the specific route.

Thus, employing the aspects disclosed in association with method 400, a database of known data points employed to calculate a route based on personal preferences or general preferences may be populated.

Figure 5A:
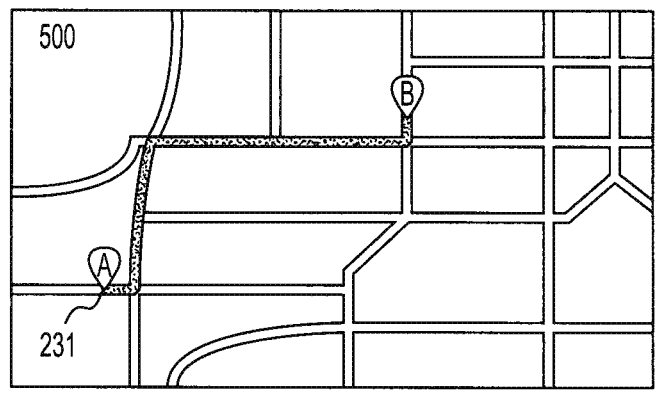
FIGS. 5(a) and (b) illustrate an example implementation of system in FIG. 2 not being employed, and an example implementation of the system in FIG. 2 being employed.

FIGS. 5(A) and (B) illustrate an example implementation of system 200 not being employed, and an example implementation of system 200 being employed.

In FIG. 5(A), system 200 is not set to provide any other route other than the optimal route 231. Thus, the GPS receiver 270 shown indicates a map 500. On the map 500, an optimal route 231 is shown. The optimal route 231 in this case may be determined based on the shortest route from point A to point B on map 500, or a combination of the other factors discussed in the Background section. Thus, in other situations, the optimal route 231 may be calculated via other techniques known in the art, for example, employing known traffic events or speed limits associated with various paths.

Figure 5B:
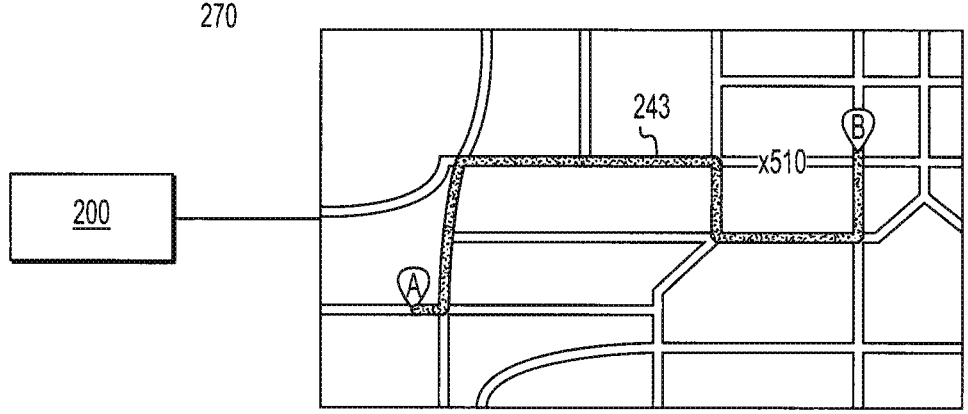

In FIG. 5(B), system 200 is implemented. The same map 500 is shown as in FIG. 5(A). However, a different route 243 is now shown. In the example shown, employing the method 400 discussed above, the system 200 is capable of knowing a preferred route of vehicle 260 associated with GPS receiver 270. In this example, the system 200 may be cognizant that the average times associated with the route 243 is faster than the optimal route 231, and thus present route 243 overlaid on map 500. In another case, the system 200 may be set to override the optimal route 231 (even if the estimated time of the optimal route 231 is ascertained to be the fasted), and present route 243. As explained above, in various embodiments and examples, route 243 may correlate to a personalized preference or a general preference ascertained via a data collection method, such as method 400 explained above.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for determining a route based on a preference, comprising:
    a data store comprising a computer readable medium storing a program of instructions for the determination;
    a processor that executes the program of instructions;
    a destination receiver to receive a destination from a GPS receiver in communication with a GPS system;
    a preference retriever to retrieve the preference based on a parameter, the preference being based on a recorded decision made by an operator associated with the GPS receiver or the GPS system in traversing a path to the destination; and
    a route analyzer to determine the route based on at least one of the preference or an optimal route calculated by a GPS system in communication with the GPS retriever,
    wherein:
        the preference is a generalized preference of all operators associated with the GPS system,
        the route analyzer determines the route as either an optimal route or a route based on the preference based on an estimated time associated with the optimal route and the route based on the preference,
        the estimated time being a weighted average of all the operators' trips travelling the route, with routes being weighted at a greater amount based on proximity to a time that the route analyzer makes the determination.

2. The system according to claim 1, further comprising a route transmitter to transmit the route to a GPS receiver.

3. The system according to claim 2, wherein the route represents a whole route from a source location to the destination.

4. The system according to claim 2, wherein the route transmitter transmits a portion of the route.

5. The system according to claim 1, wherein the preference is a personalized preference of an operator associated with the GPS receiver.

6. The system according to claim 1, wherein the system provides an option to override the optimal route.

7. The system according to claim 1, wherein the estimated time associated with the route based on preference is based on an average time associated with previous trips associated with the route based on preference.

8. A method implemented via a processor for determining a route based on a preference, comprising:
receiving a request for the route for a destination from a global positioning satellite (GPS) system;
retrieving information about a preference associated with an operator of a GPS receiver in communication with the GPS system; and
determining whether an optimal route provided by the GPS system or a route based on the preference is the quickest route,
wherein the preference is a generalized preference of all operators associated with the GPS system,
the determining further includes determining the route as either an optimal route or a route based on the preference based on an estimated time associated with the optimal route and the route based on the preference,
the estimated time being a weighted average of all the operators' trips travelling the route, with routes being weighted at a greater amount based on proximity to a time that the route analyzer makes the determination,
wherein at least one of the receiving, retrieving, and determining is performed via the processor.

9. The method according to claim 8, further comprising transmitting the route to the GPS receiver.

10. The method according to claim 9, wherein the route represents a whole route from a source location to the destination.

11. The method according to claim 9, wherein the transmitted route is a portion of the route.

12. The method according to claim 8, wherein the preference is a personalized preference of the operator.

13. The method according to claim 9, further comprising providing an option to override the optimal route.

14. The method according to claim 9, wherein the estimated time associated with the route based on preference is based on an average time associated with previous trips associated with the route based on preference.

15. A system for determining a route based on a preference, comprising:
a data store comprising a computer readable medium storing a program of instructions for the determination;
a processor that executes the program of instructions;
a destination receiver to receive a destination from a GPS receiver in communication with a GPS system;
a preference retriever to retrieve the preference based on a parameter, the preference being based on a recorded decision made by an operator associated with the GPS receiver or the GPS system in traversing a path to the destination;
a route analyzer to determine the route based on at least one of the preference or an optimal route calculated by a GPS system in communication with the GPS retriever; and
a route transmitter to transmit the route to a GPS receiver, wherein the route transmitter transmits a portion of the route, the portion of the route being defined as a lesser amount than the route.

* * * * *